United States Patent
Kang

(10) Patent No.: US 7,321,779 B2
(45) Date of Patent: Jan. 22, 2008

(54) METHOD FOR ENHANCED SHORT MESSAGE SERVICE

(75) Inventor: Bum-Chul Kang, Gyeongsangbuk-Do (KR)

(73) Assignee: LG Electronics Inc., Seoul (KR)

( * ) Notice: Subject to any disclaimer, the term of this patent is extended or adjusted under 35 U.S.C. 154(b) by 178 days.

(21) Appl. No.: 10/745,676

(22) Filed: Dec. 29, 2003

(65) Prior Publication Data

US 2004/0137922 A1    Jul. 15, 2004

(30) Foreign Application Priority Data

Dec. 31, 2002    (KR)  .................. 10-2002-0088347

(51) Int. Cl.
*H04Q 7/20* (2006.01)
*H04M 1/02* (2006.01)

(52) U.S. Cl. .................. 455/466; 341/22

(58) Field of Classification Search ........ 455/466, 455/456.3, 566; 370/335, 229; 434/113; 715/518; 341/22; 703/21; 705/14; 345/168
See application file for complete search history.

(56) References Cited

U.S. PATENT DOCUMENTS

| | | | |
|---|---|---|---|
| 6,052,070 A * | 4/2000 | Kivela et al. .............. 341/22 |
| 6,125,281 A * | 9/2000 | Wells et al. .............. 455/466 |
| 6,547,830 B1 * | 4/2003 | Mercer .............. 715/518 |
| 6,580,915 B1 * | 6/2003 | Kroll .............. 455/456.3 |
| 6,675,028 B1 * | 1/2004 | Heie .............. 434/113 |
| 6,820,049 B1 * | 11/2004 | Monroe et al. .............. 703/21 |
| 6,920,331 B1 * | 7/2005 | Sim et al. .............. 455/466 |
| 2002/0086713 A1 * | 7/2002 | Toyokura .............. 455/566 |
| 2002/0137530 A1 * | 9/2002 | Karve .............. 455/466 |
| 2002/0159387 A1 * | 10/2002 | Allison et al. .............. 370/229 |
| 2003/0016639 A1 * | 1/2003 | Kransmo et al. .............. 370/335 |

FOREIGN PATENT DOCUMENTS

CN    1237071 A    12/1999
KR    1020020070790 A    9/2002

OTHER PUBLICATIONS

KR Office Action dated Dec. 10, 2004.
Chinese Office Action (Jun. 3, 2005).

* cited by examiner

*Primary Examiner*—Joseph Feild
*Assistant Examiner*—Kiet Doan
(74) *Attorney, Agent, or Firm*—Ked & Associates, LLP

(57) ABSTRACT

A method and apparatus for an enhanced SMS can include receiving a short message, checking whether the received message is user data, processing the user data by referring to previously received control data if the received message is user data, and outputting the processed user data to a screen. The short message and SMS can be used in all mobile telecommunication devices. Further, such a short message and SMS can be encapsulated to the conventional short message service (SMS) protocol, and thereby used in a system or a protocol without change.

18 Claims, 2 Drawing Sheets

▶ RAW DATA(R[0:18])

| Y | o | u |   | a | r | e |   | m | y |   | s | u | n | s | h | i | n | e |

R[0] R[1] R[2]    R[4] R[5] R[6]    R[8] R[9]    R[11] R[12] R[13] R[14] R[15] R[16] R[17] R[18]

▶ META DATA(M[0:5])

| M[0:5] | FROM | TO | COMMAND | SUB_COMMAND |
|---|---|---|---|---|
| M[0] | 0 | 2 | 00 | 0000000000000001(ITALIC TYPE) |
| M[1] | 0 | 2 | 01 | 0000000000000011(RED COLOR) |
| M[2] | 4 | 6 | 10 | 0000000000001111(20) |
| M[3] | 8 | 18 | 11 | 0000000000000001(MARQEE) |
| M[4] | 8 | 18 | 01 | 0000000000000111(BLUE COLOR) |
| M[5] | 8 | 18 | 00 | 0000000000011111(GOTHIC TYPE) |

▶ RAW DATA OUTPUTTED TO A SCREEN OF A RECEIVING TERMINAL BY REFERRING TO META DATA

METHOD FOR ENHANCED SHORT MESSAGE SERVICE

BACKGROUND OF THE INVENTION

1. Field of the Invention

The present invention relates to a data transmission of a mobile telecommunication, and more particularly, to a short message service method and apparatus.

2. Background of the Related Art

Generally, a short message service (SMS) is a service for transmitting data of a short length (80~160 bytes) in a mobile telecommunication network. As the mobile telecommunication network advances to a digital method, the SMS is generated to transmit digital data between an inner part of the mobile telecommunication network and a cell terminal.

The SMS can be divided by a transmission method into a point to point method and a broadcasting method. Additional services relevant to the SMS are being developed on the basis of these two methods. A final destination of the point to point method is a specific terminal, and a final destination of the broadcasting method is a non-specific plurality of terminals. A minimum unit of the broadcasting method is a cell in a CDMA network, so that the broadcasting method is also called "cell broadcasting."

The CDMA method provides a data burst message in order to transmit a short message. The data burst message is a kind of container for carrying the short message and transmitting.

Several channels exist between the cell and the terminal. Among them, the short message can be transmitted by four channels. In case of a forward transmission (i.e., the terminal direction in the cell), the short message is transmitted through a paging channel or a forward traffic channel. In case of a backward transmission, the short message is transmitted through an access channel or a reverse traffic channel. If a length of the message is shorter than a data transmission boundary, the short message is transmitted through the paging channel or the access channel, and if the length of the message is longer than the data transmission boundary, the short message respectively is transmitted through the traffic channels.

SMS is provided in a text environment, and does not define a type of a character used (e.g., color, font, size, and etc.). That is, a character type of the short message is single, and the related art SMS does not apply various character types. If a user is to transmit a short message formed with a character of various types (e.g., color, font, size, and etc.) or written in a graphic environment, a web browsing function has to be added to a mobile telecommunication device and a character (or a text) has to be written by a hyper text markup language (HTML).

As described above, the related art SMS methods and apparatus have various disadvantages. For example, the related art SMS has a difficulty in satisfying various demands of a mobile telecommunication subscriber. Also, to add the web browsing function to a mobile telecommunication device in order to enhance the related art SMS methods requires many loads to an operation of the mobile telecommunication device. Further, the character data generated by the HTML has a very great capacity and a low efficiency relative to a general SMS.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method and apparatus for an enhanced SMS that supports various character types in the related art SMS protocol and a system environment.

To achieve at least the above objects and other advantages and in accordance with the purpose of the present invention, as embodied and broadly described herein, there is provided a method for an enhanced SMS that includes receiving a short message, checking whether the received message is user data, processing the user data using corresponding control data when the received message is user data and outputting the processed user data.

To further achieve at least the above objects and other advantages and in accordance with the purpose of the present invention, as embodied and broadly described herein, there is provided a method for a short message service (SMS) that includes transmitting a short message including control data, transmitting a short message including user data; and processing the user data by referring to received control data in a receiving terminal.

To further achieve at least the above objects and other advantages and in accordance with the purpose of the present invention, as embodied and broadly described herein, there is provided an apparatus that includes a terminal configured to determine whether SMS data is first type data or second type data, wherein the first type data determines attributes of the at least one portion of corresponding second type data and a network configured to couple the terminal to a communication system.

Additional advantages, objects, and features of the invention will be set forth in part in the description which follows and in part will become apparent to those having ordinary skill in the art upon examination of the following or may be learned from practice of the invention. The objects and advantage of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENT

Figure 1:
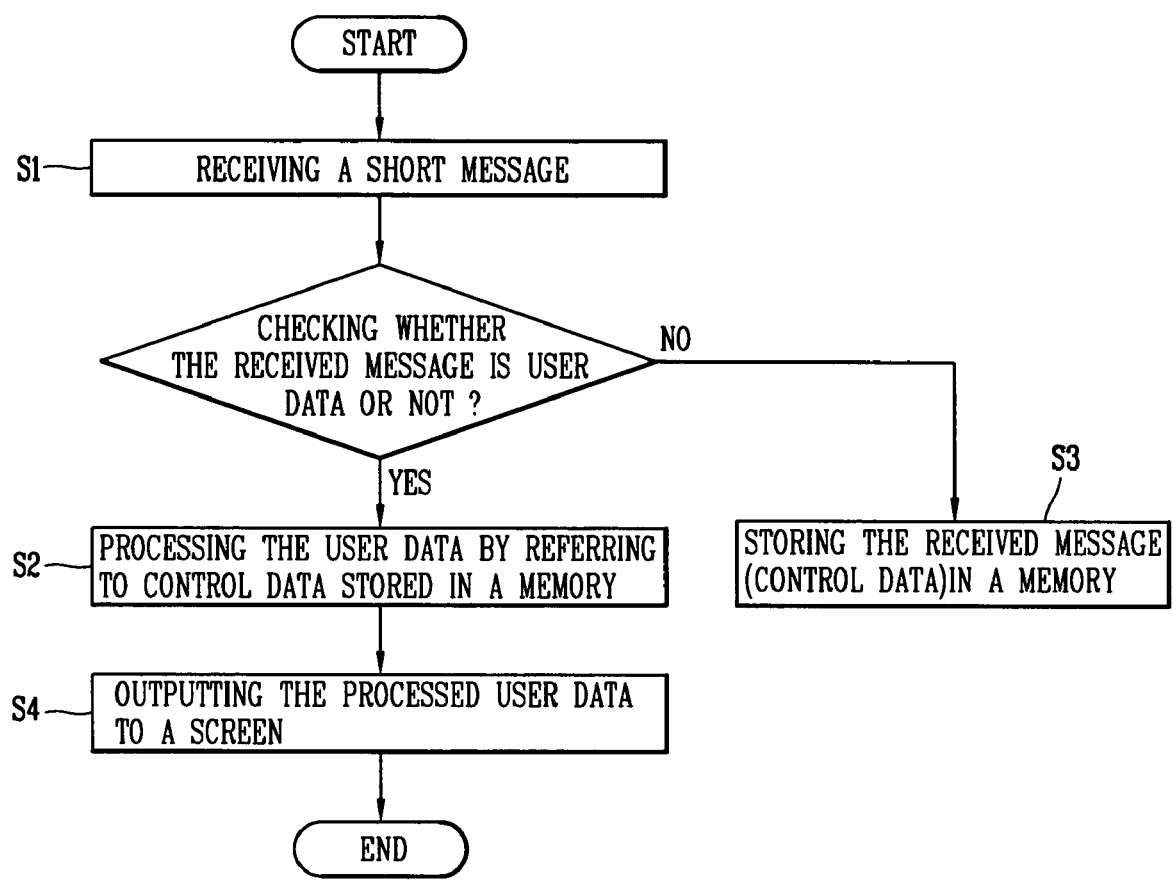
FIG. 1 is a flow chart that shows a preferred embodiment SMS method according to the present invention.

FIG. 1 is a flow chart of an embodiment of a short message service (SMS) method according to the present invention. As shown in FIG. 1, after a process starts, the SMS method can include receiving a short message (block S1). Then, it is determined whether the received message is user data or not. If the received message is user data, attributes of characters set by each command set of control data to each character of the user data can be applied by referring to the control data, that are preferably stored in a memory (block S2). The user data to which the attributes of characters have been applied are preferably output, for example, to a screen (block S4). If it is determined that the received message is control data, the corresponding control data is retained, preferably by being stored in the memory (block S3).

The user data contained in the short message is control data (hereafter, meta data) and user data (hereafter raw data). The raw data can be text data, for example, advertisement contents of a mail, and the raw data preferably has a character type array structure (e.g., Char Raw_Data [80]). The character type is 2 byte unit. Since a size of the short message is generally 80 to 160 bytes, the raw data contained in the short message can have an upper limit or maximum of 80 characters.

The meta data can include character control information that effects or marks up the raw data, that is, information where types of each character (e.g., color, font, size, and etc.) are defined. The meta data contained in the short message can be an upper limit or maximum of 40 command sets.

In order to designate or divide the two types of user data, that is, in order to let a receiving terminal know which user data is included in a received short message, embodiments can use a reserve region of a data burst message. One bit of the reserve region is preferably used as a data division field (e.g., meta data & raw data). For example, if the data division field value is 1, data contained in a corresponding message is the meta data, and if the data field value is 0, data contained in a corresponding message is the raw data. However, the present invention is not intended to be so limited in approaches to designate the user data type.

Also, embodiments of the present invention can transmit a short message two times (e.g., a message transmission for the meta data and a message transmission for the raw data) per one mail (e.g., advertisement, information). The short message for the meta data is preferably transmitted first, and the short message for the raw data is transmitted later.

A terminal according to embodiments of the present invention has to apply a SMS and be variously provided with a simple character input function and an edition function that would be known to one of ordinary skill in the art.

If the short message of meta data is received, the receiving terminal can store the meta data in a received message list (or memory). If meta data received from the same sender exists in the received message list of the receiving terminal when the short message of meta data is received, the receiving terminal preferably updates the newly received meta data in the received message list.

If the short message of raw data is received, the receiving terminal processes the received raw data by referring to the meta data stored in the received message list and outputs to a screen. If an originating terminal transmits only the short message of raw data without transmitting the short message of meta data, the receiving terminal preferably processes the newly received raw data by referring to the previously received meta data of the received message list. However, if meta data received from the same sender does not exist in the received message list, the receiving terminal can process the raw data according to a default value and before outputting to the screen.

For example, in case that an advertisement company transmits several advertisement mails of similar contents to registered customers by using the SMS, the short message of meta data and the short message of raw data are both preferably transmitted only when first mails (e.g., advertisement and information) are sent. When the next or additional advertisement mails are sent, only the short message of raw data can be transmitted. Accordingly, the receiving terminal can process the remaining or following raw data, which are received later, by referring to the meta data stored in the received message list (e.g., the meta data of the first mails). At this time, the remaining raw data can have a character array or a structure that can refer to the meta data stored in the received message list (e.g., meta data of the first mails).

A following example 1 shows an exemplary command set structure of meta data defined according to an embodiment of the present invention.

EXAMPLE 1

```
Typedef Structure
{
    from (7 bit)         / starting position of a character to which a
                           command is to be applied/
    to (7 bit)           / last position of a character to which a
                           command is to be applied/
    command (2 bit)      / command item/
    sub_command (16 bit) / attribute of command item/
} Meta_Data [40]
```

The "from" (e.g., 7 bit) can denote a starting index of a character among character arrays of raw data to which a command is to be applied, and should have at least 7 bit ciphers since at least an 80 array index has to be expressed. The "to" (e.g., 7 bit) can denote a last index of a character among character arrays of raw data to which a command is to be applied, and should have at least 7 bit ciphers since at least an 80 array index has to be expressed.

The "command" (e.g., 2 bit) can denote a command word showing types (e.g., color, font, size, and etc.) to be applied to characters from the starting index to the last index. A following table shows one example of command values. However, the present invention is not intended to be so limited. Further, the values can be changed, for example, at the time of an actual realization.

TABLE

| Command | Item |
| --- | --- |
| 00 | Font control |
| 01 | Color control |
| 10 | Size control |
| 11 | Text effect control |

The "sub command" (e.g., 16 bit) can indicate attributes of the command, and preferably has 16 bit ciphers. In case that the command is font control (e.g., 00), a value of the sub command (16 bit) indicates a kind of font to be changed.

A following example 2 shows an exemplary subset of font types represented by the sub command (16 bit) when the command is font control.

EXAMPLE 2

0000000000000000: roman type (Default)
0000000000000001: italic type
0000000000000011: arial type
0000000000011111: gothic type In case that the command is 01, a value of the sub command (e.g., 16 bit) can indicate 65536 color information. In case that the command is 10, a value of the sub command (16 bit) can indicate a font size. In case that the command is 11, a value of the sub command (16 bit) can indicate each kind of text effect for applying to raw data.

A following example 3 shows an exemplary subset of text effects represented by the sub command when the command is text effect control.

EXAMPLE 3

0000000000000000: no text effect (Default)
0000000000000001: marqee
0000000000000010: blink
0000000000000011: fade out
0000000000000100: fade in If a value of the sub command (16 bit) is 0 or Null, the raw data preferably maintains a setting value (e.g., default value) of the existing SMS (or receiving terminal or the like). A exemplary set of default values can include a default value of font '0000000000000000') is roman type, a default value of color is black, a default value of size is 10, and a default value of text effect is no text effect. A number of ciphers of the sub command (16 bit) is $2^0 \sim 2^{16}$(65536), so that expressible number is large and variable within such a limit. However, the present invention is not intended to be so limited because other values for the default values or "sub command" are possible. Thus, up to 65536 font types could be represented.

Figure 2:
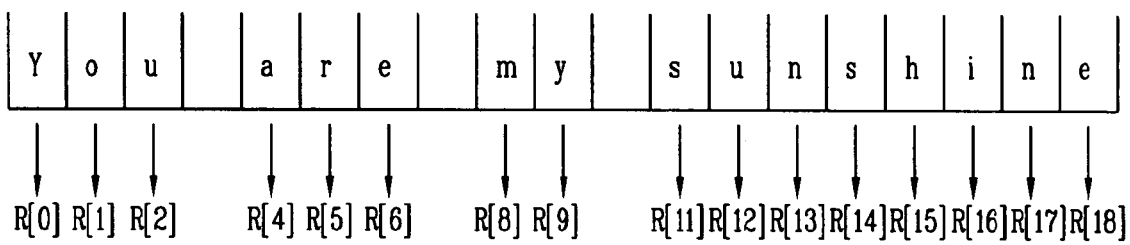
FIG. 2 is a diagram that shows exemplary structures of meta data and raw data.

FIG. 2 is a diagram showing exemplary structures of meta data and raw data. As shown in FIG. 2, an exemplary raw data is composed of 19 characters, e.g., 19 character arrays (R[0:18]). If the 19 characters are arranged, "You are my sunshine" is formed. The number of an exemplary command set of meta data that determines a character type of the raw data (R[0]~R[18]) is 6 (M[0]~M[5]) as shown in FIG. 2.

Raw data controlled by the M[0] and M[1] are "You" (R[0]~R[2]), which are command sets for setting a font of the corresponding raw data (R[0]~R[2]) as italic type and setting a color as red. Raw data controlled by the M[2] are "are" (R[4]~R[6]), which is a command set for setting a font size of the corresponding raw data (R[4]~R[6]) as 20.

Raw data controlled by the M[3], M[4], and M[5] are "my sunshine" (R[8]~R[18]), which are command sets for setting text effect of the corresponding raw data (R[8]~R[18]) as 'marqee', setting a color as blue, and setting font as gothic type. The marqee can make a text (e.g., characters) be moved.

According to embodiments of the present invention, the number of the command set of meta data that can transmitted using a short message has an upper limit, which is preferably a maximum of 40. This is excellent efficiency relative to the HTML method. Also, considering that the number of characters (e.g., 2 byte) transmitted as a short message is generally 80, it is very excellent efficiency. Further, since a structure of the command set constituting the meta data is elastic or variable, setting the command set and then changing its structure are easily performed. In addition, the meta data can be transmitted ahead of time or independently and can be applied to only designated or all following raw data from that user or defined users.

The short message and SMS according to embodiments of the present invention is encapsulated to the conventional SMS protocol, and therefore it can be used in a system or a protocol without change. Also, the short message according to embodiments can be used in all mobile telecommunication devices.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for an enhanced SMS, comprising:
   receiving a short message;
   checking whether the received message is user data;
   processing the user data using corresponding control data when the received message is user data, the processing comprising applying attributes of characters determined by each command set of the control data to each character of the user data, the command sets setting at least two attributes of each said character; and
   outputting the processed user data,
   wherein each command set comprises:
      location information of a character;
      command item information; and
      attribution information of the command item information, the command item information including font control, color control, size control and text effect control, and wherein the attribution information includes a plurality of font types for the font control, a plurality of colors for the color control, a plurality of sizes for the size control and a plurality of text effects for the text effect control.

2. The method of claim 1, further comprising storing the corresponding control data in a memory when the received message is control data, and outputting the processed user data to a screen.

3. The method of claim 2, wherein when control data from a same sender already exists in the memory, the control data from the same sender is updated using the corresponding control data.

4. The method of claim 1, wherein the characters of the user data have an array structure of a character unit.

5. The method of claim 1, wherein the short message includes one of user data and control data.

6. The method of claim 1, wherein a message of the corresponding control data is received before the user data.

7. A method for a short message service (SMS), comprising:
   transmitting a short message including control data;
   transmitting a short message including user data; and
   processing the user data by referring to received control data in a receiving terminal, the processing comprising applying attributes of characters, determined by command set of the control data to each character of the user data, the command sets setting at least two attributes of each said character,
   wherein said command set comprises:
      location information of a character;
      command item information; and
      attribution information of the command information, the command item information including font control, color control, size control and text effect control, and wherein the attribution information includes a plurality of font types for the font control, a plurality of colors for the color control, a plurality of sizes for the size control and a plurality of text effects for the text control.

8. The method of claim 7, further comprising outputting the processed user data to a screen.

9. The method of claim 7, wherein a command set comprises:

location information of a character;
command item information; and
attribution information of the command item information.

10. The method of claim 9, wherein the control data and the user data are sent by the same sender.

11. The method of claim 10, wherein the short message of the corresponding control data is received before the short message of the user data by the receiving terminal, wherein when the corresponding control data from the same sender already exists, the corresponding control data from the same sender is updated.

12. An apparatus, comprising:
a terminal configured to determine whether SMS data is first type data or second type data, the first type data being composed of a plurality of command sets that determine at least two attributes of a character in the corresponding second type data, the terminal processing the second type data by referring to the first type data, the processing comprising applying attributes of characters determined by command set of the first type data to each character of the second type data, wherein said command set comprises:
location information of a character;
command item information; and
attribution information of the command item information, the command item information including at least one of font control, color control, size control and text effect control, and wherein the attribution information includes a plurality of font types for the font control, a plurality of colors for the color control, a plurality of sizes for the size control and a plurality of text effects for the text effect control.

13. The apparatus of claim 12, wherein a command set comprises:
location information of a character;
command item information; and
attribution information of the command item information.

14. The apparatus of claim 12, wherein the terminal is at least one of a transmitting terminal and a receiving terminal.

15. The apparatus of claim 14, wherein the apparatus is a mobile terminal.

16. The apparatus of claim 12, wherein the apparatus comprises at least one mobile terminal and a base station.

17. A method for a message service in a mobile terminal comprising:
receiving a message;
checking whether the received message is user data;
processing the user data using corresponding control data when the received message is user data, the processing step comprising applying attributes of characters determined by command set of the control data to characters of the user data; and
outputting the processed user data,
wherein the command set comprises:
location information of a character;
command item information; and
attribution information of the command item information, and
wherein the command item information includes:
font control;
color control;
size control; and
text effect control, and
wherein the attribution information includes:
a plurality of font types for the font control;
a plurality of colors for the color control;
a plurality of sizes for the size control; and
a plurality of text effects for the text effect control.

18. An apparatus, comprising:
a terminal configured to receive a message, check whether the received message is user data, process the user data using corresponding control data when the received message is user data, the processing step comprising applying attributes of characters determined by command set of the control data to characters of the user data, and output the processed user data,
wherein the command set comprises:
location information of a character;
command item information; and
attribution information of the command item information, and
wherein the command item information includes:
font control;
color control;
size control; and
text effect control, and
wherein the attribution information includes:
a plurality of font types for the font control;
a plurality of colors for the color control;
a plurality of sizes for the size control; and
a plurality of text effects for the text effect control.

* * * * *

UNITED STATES PATENT AND TRADEMARK OFFICE
CERTIFICATE OF CORRECTION

| | | |
|---|---|---|
| PATENT NO. | : 7,321,779 B2 | |
| APPLICATION NO. | : 10/745676 | |
| DATED | : January 22, 2008 | |
| INVENTOR(S) | : Bum-Chul Kang | |

It is certified that error appears in the above-identified patent and that said Letters Patent is hereby corrected as shown below:

Col. 6, claim 1, line 7 (which corresponds to column 6, line 14), ( 1st occurrence) delete the word "each", and line 11 (which corresponds to column 6, line 18), delete the word "each" and insert --said--.

Col. 7, claim 12, line 15 (which corresponds to column 7, line 26), delete the phrase "at least one of".

Signed and Sealed this

Tenth Day of February, 2009

JOHN DOLL
*Acting Director of the United States Patent and Trademark Office*